Jan. 23, 1923.

T. H. WEBB.
BELT UTILIZED FOR TRANSMISSION OF POWER.
FILED MAY 12, 1921.

1,443,061

Inventor-
Thomas Henry Webb.
By B. Sidger, Atty

Patented Jan. 23, 1923.

1,443,061

UNITED STATES PATENT OFFICE.

THOMAS HENRY WEBB, OF ST. JOHN'S, WAKEFIELD, ENGLAND.

BELT UTILIZED FOR TRANSMISSION OF POWER.

Application filed May 12, 1921. Serial No. 469,017.

*To all whom it may concern:*

Be it known that I, THOMAS HENRY WEBB, a subject of the Kingdom of Great Britain, residing at St. John's, Wakefield, in the county of York, England, have invented certain new and useful Improvements in or Relating to Belts Utilized for the Transmission of Power, of which the following is a specification.

The present invention has relation to belts utilized for the transmission of power, more particularly to those belts involving a series of leather or like elements or blocks pivotally or flexibly united or assembled. Such belts have been constructed to a V or equivalent section or configuration and are adapted to cooperate with pulleys having V-shaped grooves or channels.

According to the present invention an improved belt, of the foregoing character, is provided, involving a central link chain which extends throughout the length of the belt and absorbs or withstands the endlong tension applied to the belt when same is transmitting power, and said link chain is provided on each of its outer longitudinal faces with a series or succession of leather or equivalent pads or members of tapering section, and these pads or members of tapering section constitute the frictional gripping faces which engage the V groove in the pulley. The chain in this invention involves a series of centre links or blanks flatwise embraced on each side and pivotally united by outer links.

A screw member of the character of an ordinary wood screw may be employed to transversely unite two adjacent pads or members and the fulcrum or hinged points of the various links and constituted by pressing up parts of the centre links and assembling said integral pressed-up parts in apertures in the outer or pad carrying links.

In order that this invention may be clearly understood and readily carried into practice, reference may be had to the appended explanatory sheet of drawings, upon which:—

Figure 1:
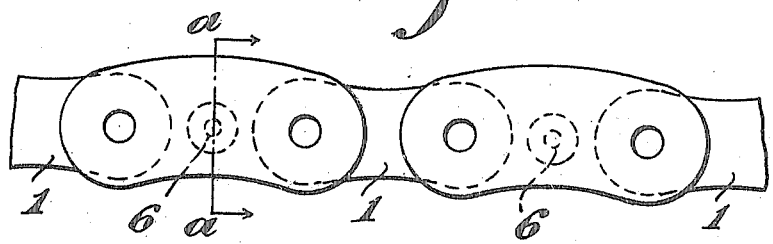
Figure 1 is a side elevation of a short length of transmission belting constructed according to the present invention.
Figure 2:
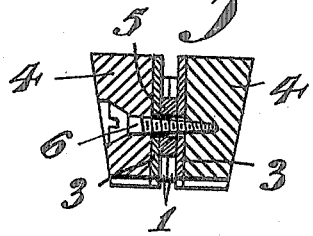
Figure 2 is a transverse sectional view of the same in the plane indicated by the line *a—a* of Fig. 1.
Figure 3:
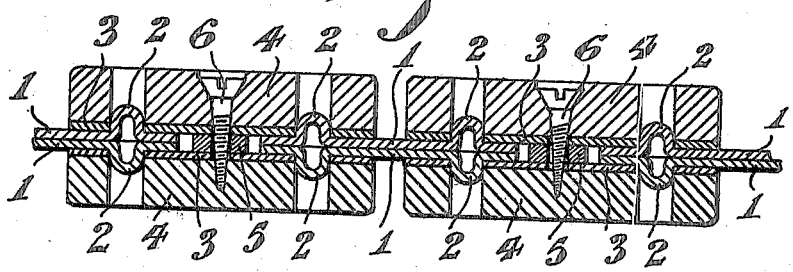
Figure 3 is a horizontal sectional view of the same.

In accordance with my invention (Figures 1 and 2) the chain is constituted of a series of steel links or plates stamped up or otherwise formed from sheet metal and pivotally united. This chain involves a series of pairs of centre links or oblong sheet metal blanks 1 disposed in mutual contact and each pair of these centre links or plates 1, are united by a pair of side links or plates 3, said side links being disposed on the outer side of the centre links or plates as shown. The side links or plates 3 are steel stampings or other blanks or oblongs and are pivotally united flatwise against the centre links 1 by means of bosses or cup-shaped bearing members 2 which are pressed up from the sheet metal plates 1 so that when the two blanks are assembled side by side the bosses or cup-shaped members 2 project oppositely to virtually constitute a hollow fixed transverse bearing member. The side links 3 are each perforated in two positions along their length and are assembled one on each side of the dual centre links 1 so that the perforations engage the transverse integral bearing parts 2 of the centre links 1. Leather pads 4 are assembled on the faces of the side links 3 and may conveniently be united by a screw member 6 and a packing piece or distance piece 5 of metal or any other suitable material may be assembled between the side links 3 adjacent where two centre links terminate to position the side links and prevent same from being distorted or bent inwardly towards one another. The leather pads or like members 4 are drilled or bored transversely to accommodate the integral transverse bearing parts 2, of the central links 1.

From the foregoing description it will be seen that the belt involves an inner chain core said core being provided on each side with a succession of leather or like pads which constitute the gripping medium of the belt while the chain core is adapted to withstand the tension to which the belt is subjected during the transmission of power. The chain core may be of metal as aforestated or same may be constructed of any other suitable material adapted to withstand the tension to which the belt is subjected.

To form an endless belt of the foregoing character, it is only necessary to unite the two extremities of the chain. With the present driving belt, on account of the centre core or chain structure aforementioned, there will be little or no longitudinal undesirable stretching during or after use.

What I claim as my invention, and desire to secure by Letters Patent, is:—

1. A transmission belt comprising sheet metal links having integral outstruck pivoting bosses and links connecting the first named links and having openings in which said bosses are engaged, and a series of leather blocks mounted upon the second named links.

2. A transmission belt comprising sheet metal links having integral outstruck pivoting bosses, and links connecting the first named links and having openings in which said bosses are engaged.

In witness whereof I have hereunto set my hand.

THOMAS HENRY WEBB.